United States Patent

Rembert

[15] 3,642,023

[45] Feb. 15, 1972

[54] DRINKING WATER SUPPLY FOR AUTOMOTIVE VEHICLES

[72] Inventor: Charles Rembert, 8946 South Essex Street, Chicago, Ill. 60617

[22] Filed: June 25, 1970

[21] Appl. No.: 49,751

[52] U.S. Cl. ............................... 137/209, 137/353, 222/394
[51] Int. Cl. ....................................................... B67d 5/54
[58] Field of Search .................. 137/209, 353, 557; 220/25; 222/394

[56] References Cited

UNITED STATES PATENTS

| | | | |
|---|---|---|---|
| 2,813,537 | 11/1957 | Lind | 137/353 |
| 3,231,713 | 1/1966 | Menuto | 137/353 X |
| 3,385,318 | 5/1968 | Kilbourn | 137/557 |
| 1,846,400 | 2/1932 | Macfarlane | 220/25 |
| 2,760,670 | 8/1956 | Moore | 220/25 |

*Primary Examiner*—Alan Cohan
*Attorney*—Hill, Sherman, Meroni, Gross & Simpson

[57] ABSTRACT

The invention disclosed relates to a drinking water supply for automotive vehicles wherein a supply of cold water is carried in a pressurized, insulated container in the trunk compartment of the vehicle and conveyed to a suitably positioned dispensing faucet within the vehicle. The invention is characterized by the provision of improved means for pressurizing the container and with improved means for mounting the dispensing faucet and an associated drain conduit at a convenient and accessible position within the vehicle body.

3 Claims, 3 Drawing Figures

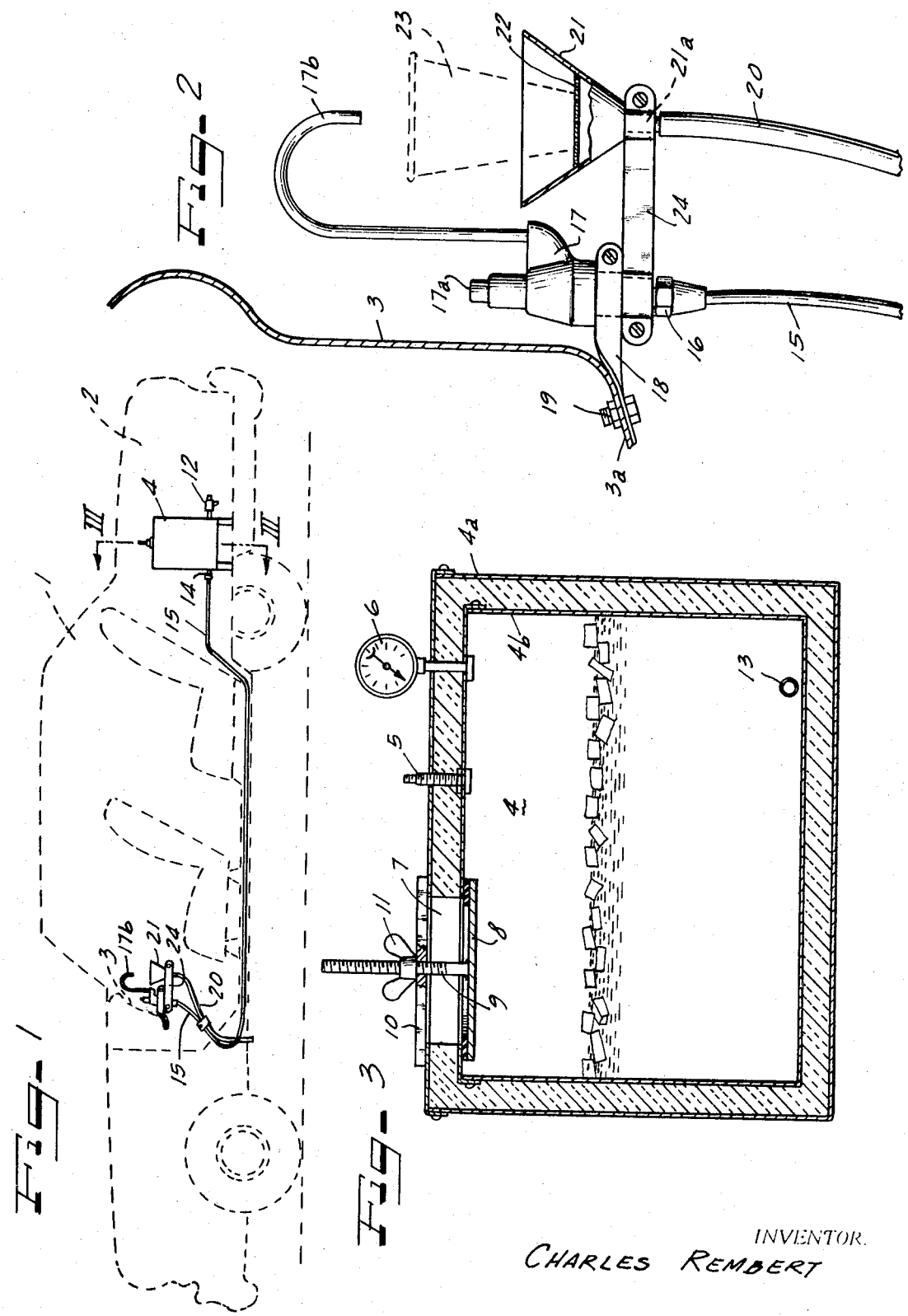

3,642,023

DRINKING WATER SUPPLY FOR AUTOMOTIVE VEHICLES

BACKGROUND OF THE INVENTION

SUMMARY OF THE INVENTION

The invention herein disclosed consists of a simple, inexpensive and reliable system for the provision of cold drinking water within the interior of an automotive vehicle. The system incorporates a pressurized, insulated container preferably mounted within the trunk compartment of the vehicle and having communicating therewith a conduit extending to the interior of the vehicle where it is rigidly supported and terminates in a faucet through which the cold water from the container is dispensed. Also supported from the same means that connects the dispensing end of the conduit and faucet to the vehicle body is a drain conduit extending to the exterior of the vehicle body and provided with a funnellike opening and a perforated support on which there may be positioned a paper cup, glass or other container into which the water is to be dispensed.

Systems for the provision of cold drinking water and similar cold fluids to the occupants of an automotive vehicle through a faucet within the vehicle are not broadly new. Those systems of the prior art, however, as to which applicant has knowledge are cumbersome, expensive and difficult to install. Where fluid has been dispensed from a pressurized container, excess pressure in that container has caused splashing at the dispensing faucet. Furthermore, the pressurization of the container in the structures of the prior art has been difficult and usually involves the provision of a special pump and connection.

It is an object of this invention to provide a system which is inexpensive to construct, easy to install and one wherein the supply container (of ice and cold water) may be pressurized to a predetermined amount, determinable by a gauge that is provided, through an ordinary "tire-type" valve which provides an exterior connection with the compressed air supply, such, for example, as a tire pump or the compressed air hoses readily available at practically all service stations.

It is a further object of this invention to provide such a supply system wherein the dispensing faucet and an associated drain conduit and drinking receptacle support are secured to the vehicle body by a simple rigid bracket and are also secured in rigid association with each other by a simple clamp.

Other and further objects of the present invention will be apparent from the disclosures in the following specification and the accompanying drawings.

BRIEF DESCRIPTION OF THE DRAWINGS

FIG. 1 is a side elevation with the vehicle and vehicle body shown in dotted lines which discloses the positioning of the system of my invention within an automotive vehicle and arranged for dispensing of drinking water from a container in the trunk compartment at a convenient place within the vehicle body adjacent the instrument board in the front compartment thereof.

FIG. 2 is a side elevational view partly in section and somewhat enlarged showing the dispensing faucet, the drain conduit and a support for the drinking cup or similar receptacle positioned on a perforated container within an enlarged portion at the upper end of the drain conduit.

FIG. 3 is an enlarged sectional view on line III—III of FIG. 1 with parts shown in elevation.

DETAILED DESCRIPTION

Shown in dotted lines in FIG. 1 are the outlines of a vehicle body indicating the position of the usual passenger seats, a trunk compartment 2, and an instrument panel or dashboard 3.

Mounted within the trunk compartment 2 and accessible by raising the usual trunk lid provided in automotive vehicles is a pressurized container 4 having spaced noncorrosive metallic walls 4a and 4b with a filling of insulating material such as styrofoam, fiber glass, or the like between the walls at the top, sides, bottom and ends.

A tire-type valve 5 provides means whereby the interior of the container may be placed under pressure by connecting an ordinary tire inflation pump to the valve in the usual manner and then operating the pump until a desired pressure is reached or by connecting to the valve the usual compressed air hose found in service stations.

The pressure of the interior of the container is preferably indicated by a gauge 6 although, if desired, the gauge may be omitted and pressure determined by the use of an ordinary portable tire pressure valve. An opening 7 is provided in the top wall of the container 4 to permit of the introduction of water and ice into the interior of the container. This opening is sealed pressuretight by a gasketed plate 8 engaging the inside of the top wall of said container and held in position by an upwardly projecting stud bolt 9 which extends upwardly through an opening in a support plate 10 resting on the top of the container and affording an abutment for the underside of a wingnut 11 threaded on the stud bolt 9.

It is apparent that by reason of the foregoing construction, the wingnut 11 may be loosened sufficiently to permit of lowering of the sealing plate 8 and the moving thereof into edgewise position where it may be removed from the container to permit of the introduction of water and ice. Thereafter, the sealing plate 8 is moved into the position shown in FIG. 3 so that the support plate 10 is positioned and the wingnut 11 tightened to bring the sealing plate 8 into tight sealing position covering and surrounding the opening 7 in the top wall of the container 4. In order to permit of cleaning and draining the container, a drain faucet 12 is provided as shown in FIG. 1.

The bottom of the container is also provided with an opening 13 carrying a connection 14 to which is connected in the usual manner a flexible conduit or pipe (preferably of the plastic hose type) 15. The conduit 15 extends either underneath the vehicle body or underneath the carpet inside of the vehicle body forwardly to a fitting 16 which provides a connection with a dispensing faucet 17 of any desired type, the type here shown being one wherein the discharge is actuated by depressing a pushbutton 17a to permit fluid to flow out through a dispensing connection 17b.

The dispensing faucet assembly is supported on the instrument panel or front dashboard of the vehicle by a simple strap-type metal clamp 18, a portion of which is twisted to a 90° angle to permit its resting against the underside of a flange 3a on the instrument panel, the support and clamp then being secured to the instrument panel by a bolt and nut 19.

Positioned adjacent the faucet 17 and the upper end of the supply conduit 15 is a drain conduit 20 which extends to the exterior of the vehicle body as shown in FIG. 1. The drain conduit 20 is provided with an enlarged funnellike upper end 21 which in turn carries a perforated plate 22 that supports a receptacle 23, such as a paper or plastic container, drinking glass or the like. It will be apparent that fluid spilled from the glass or inadvertently drawn from the faucet 17–17b will be received within the cone-shaped portion 21 at the top of the drain conduit 20 and conveyed to the exterior of the vehicle through the drain conduit 20.

The drinking receptacle support and drain conduit assembly are secured in fixed position relative to the faucet and conduit 15 by a straplike clamp member 24 which is clamped around the bottom portion of the faucet where it connects with the fitting 16 and which is also clamped to a portion 21a which connects the conduit 20 with the funnellike member 21.

As will be apparent from the foregoing description, I have provided a simple, inexpensive and effective apparatus to be used in the supplying of drinking water to the interior of automotive vehicles. This is very useful particularly when traveling with children who frequently demand that they be given a drink of water. Having the supply available, the necessity of stopping the vehicle at a place where drinking water may be obtained is obviated. The water is kept cold by reason of the insulation of the container 4 and further by the placing of ice with the water in that container. The container is readily pressurized by means available to all motorists and without the necessity of a special pressure pump or the like. The dispensing and drain support are conveniently carried by the body of the vehicle through the simple clamp bracket which may be attached to the body of the vehicle by a single bolt and nut connection.

Spillage of water discharged from the faucet 17-17b is carried away from the interior of the vehicle by the drain assembly 20-21. This drain assembly is retained and positioned to receive such spillage by the simple rigid clamp support 24.

I am aware that details of my invention may be varied without departing from the principles thereof and I, therefore, do not purpose limiting the patent granted hereon otherwise than indicated by the scope of the appended claims.

I claim:

1. A drinking supply system mounted in a motor vehicle comprising: an insulated supply vessel mounted in the luggage compartment of said vehicle, a first faucet mounted adjacent the bottom of said vessel for withdrawing liquid therefrom, a valve-controlled liquid-dispensing faucet mounted in the passenger area of said vehicle at a location accessible to the driver, a liquid conduit connecting the lower portion of said vessel with said faucet, an air inlet for said vessel, controlled by a tire-type valve, an opening in the top wall of said vessel for inserting ice cubes and filling with liquid, an airtight closure for said opening, a funnel-shaped receptacle support mounted adjacent said liquid-dispensing faucet, a drain conduit attached to said receptacle support and extending to the exterior of said vehicle, a clamp member, engaging the stem of said funnel-shaped support, for rigidly fastening said support to said liquid dispensing faucet in a position with the outlet thereof directly above said funnel-shaped support, and bracket means rigidly mounting said liquid-dispensing faucet to the interior of said vehicle.

2. A drinking supply system in accordance with claim 1 in which said liquid-dispensing faucet and receptacle support are supported by a strap-type clamp from the under side of the vehicle instrument panel in a position below the vehicle windshield.

3. A drinking supply system in accordance with claim 2 in which said closure comprises a gasketed plate, engaging the inside top wall surrounding said opening, held in position by an upwardly projecting stud bolt fastened to said plate, a support plate directly over said opening through which said bolt passes, and a nut threaded onto said bolt above said support plane.

* * * * *